Figure 1:
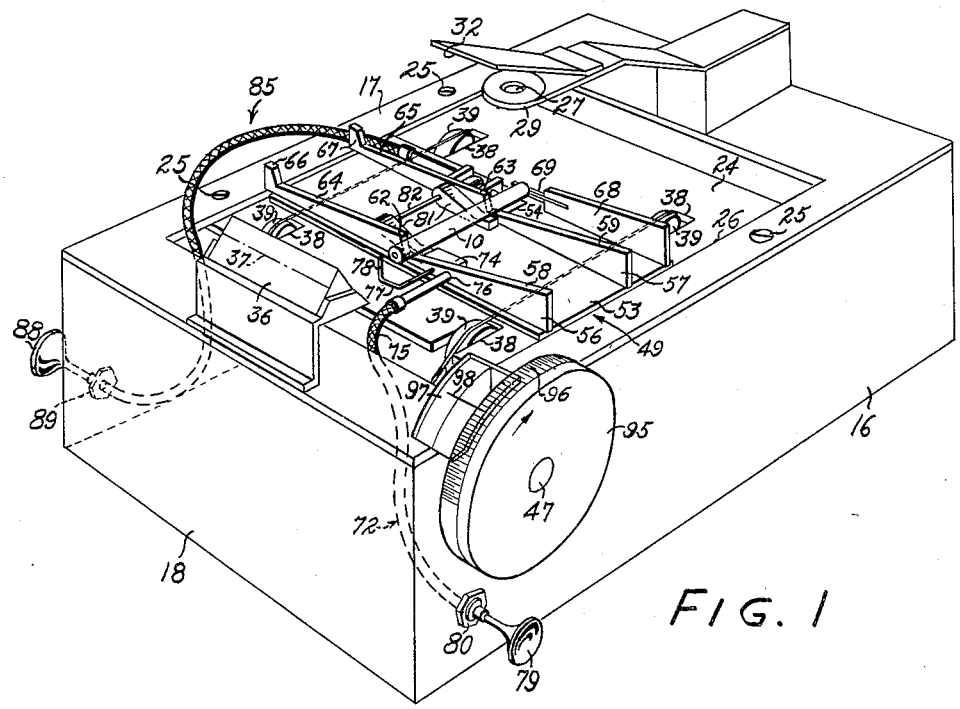

March 6, 1951 W. W. DAVIS ET AL 2,544,629
CAPILLARY TUBE HANDLING AND PROJECTING APPARATUS
Filed March 14, 1950 2 Sheets-Sheet 1

INVENTORS
WILLIAM W. DAVIS
BY THOMAS V. PARKE

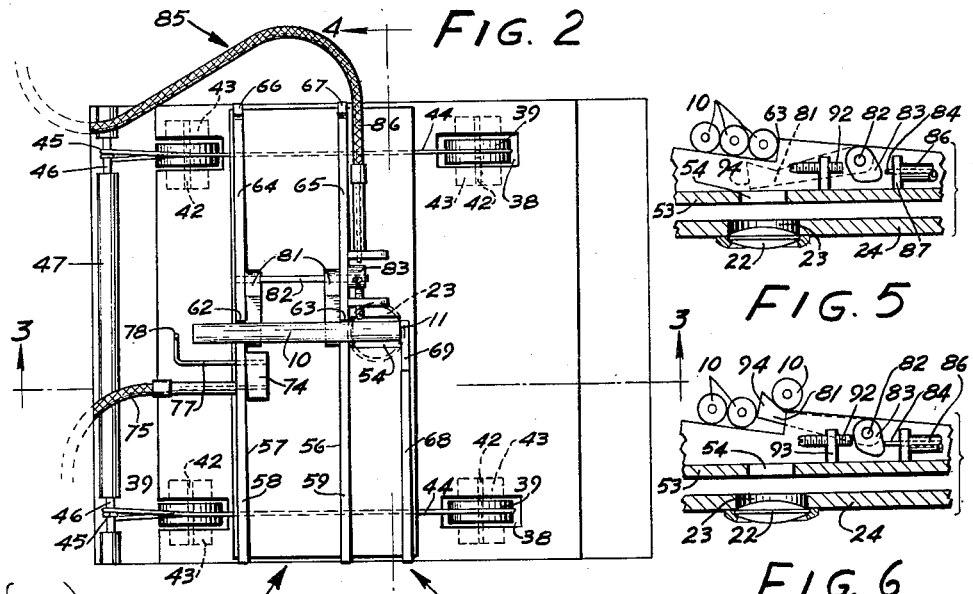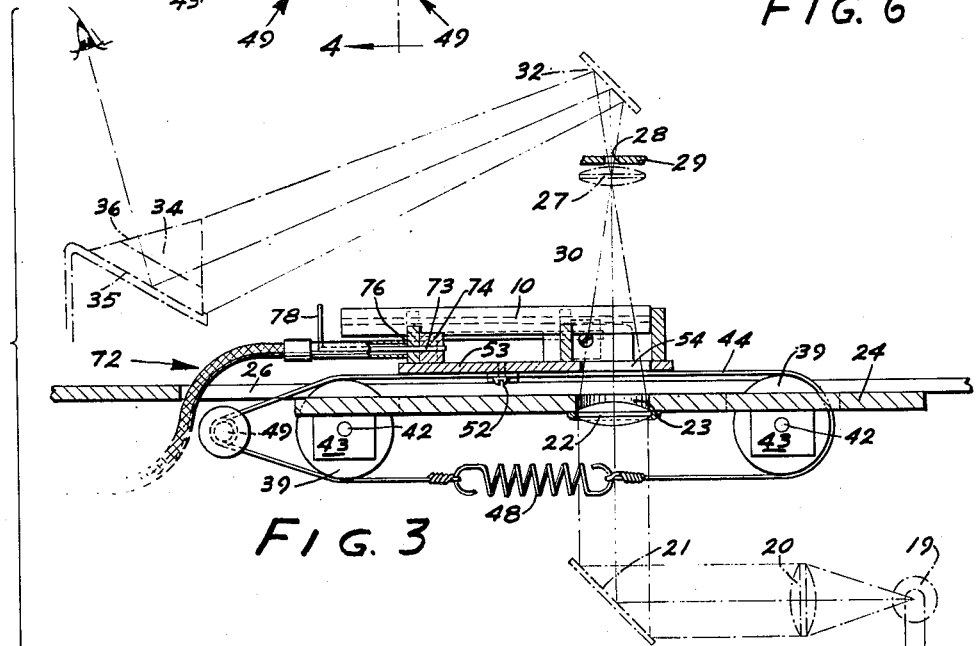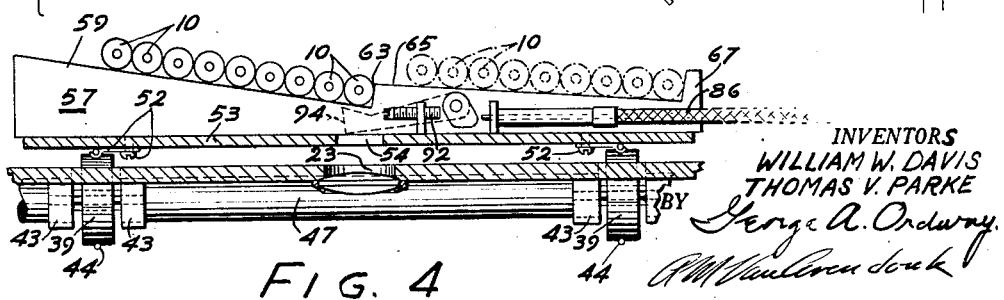

Patented Mar. 6, 1951

2,544,629

UNITED STATES PATENT OFFICE 2,544,629

CAPILLARY TUBE HANDLING AND PROJECTING APPARATUS

William W. Davis, Greenwood, and Thomas V. Parke, Indianapolis, Ind., assignors to Eli Lilly and Company, Indianapolis, Ind., a corporation of Indiana Application March 14, 1950, Serial No. 149,616

6 Claims. (Cl. 88—24)

This invention relates generally to machines for assaying the antibacterial activity of antibiotics, such as penicillin, streptomycin and the like. More particularly this invention relates to a capillary tube handling apparatus for such machines.

One efficient, economical, and accurate method used for assaying antibiotics employs uniform, relatively short capillary tubes, each having one end ground flat.

To carry out an assay with such capillary tubes, the tubes are partially filled with a bacteria- or spore-inoculated, solidifiable, nutrient medium, e. g., an agar medium, care being taken in the filling to have the medium in the cannula of each tube, flat and flush with the flat end of the tube. The filled tubes are partially immersed, flat end down, in a solution of the antibiotic under test, and incubated for a number of hours. For reference standards other tubes are similarly filled and placed in known dilutions of the antibiotic. During the incubation the antibiotic diffuses into the medium in the tubes, and for a distance from the flat ends of the tubes inhibits the vegetative bacterial growth which normally would take place in the medium. The medium remains clear and relatively transparent from the flat end over the linear distance through which the antibiotic has diffused in sufficient concentration to inhibit bacterial growth, that distance being the zone of inhibition. That distance is directly related to the antibacterial potency of the antibiotic and is a measure of the concentration and/or potency of the antibiotic in the solution. Measurement of the distance from the flat end of a tube to the end of the clear area provides an accurate determination of the antibacterial potency of the antibiotic. Accurate measurement of the clear area is aided by the occurrence immediately next to it of a narrow band of intense bacterial growth.

Machines have heretofore been provided for facilitating antibiotic assays. One of such machines employs a means for projecting a beam of light through test bodies of the character above described to project an image of the contrasting zones of growth and inhibition upon a stationary inspection surface having a reference line thereon. The machine employs a means for translationally shifting the bodies over the light beam so as to move the clear zone image with respect to the inspection surface reference line. The means for shifting the test bodies is provided with a calibrated dial the movement of which with respect to a stationary indicator correlated with the reference line, permits the taking of a ready, accurate reading of that length of movement which it is necessary to impart to the body to cause the inspection surface image of its clear area commencing at the flat end of the tube, to traverse the reference line and bring the latter into registration with the line of demarcation between the clear area and the region of aerobic growth.

Such readings taken from the tubes in which samples of different batches of antibiotics have been diffused are compared with the known reference standards to determine their potency values.

It is an object of the present invention to provide an apparatus for facilitating and expediting the presentation of a supply of such capillary tubes from which test readings are to be taken toward test reading position on the machine.

Another object of the invention is to provide in an apparatus of this character means whereby the tubes may be easily and rapidly fed at the will of the operator, consecutively, one by one, into reading position with respect to the light beam of the machine.

A further object is to provide means for simultaneously ejecting a tube from reading position as a fresh tube is fed thereto.

A still further object of the invention is to provide means for collecting the tubes following their ejection from reading position for convenient removal from the machine.

Another object of the invention is to provide manipulative means conveniently operable to align each tube positively into proper reading position preparatory to the taking of a reading.

With these and other incidental objects in view, the invention comprises certain novel features of construction and combinations of parts, the essential elements of which are set forth in appended claims, and a preferred embodiment of which is hereinafter described with reference to the drawings which accompany and form part of this specification.

Figure 7:
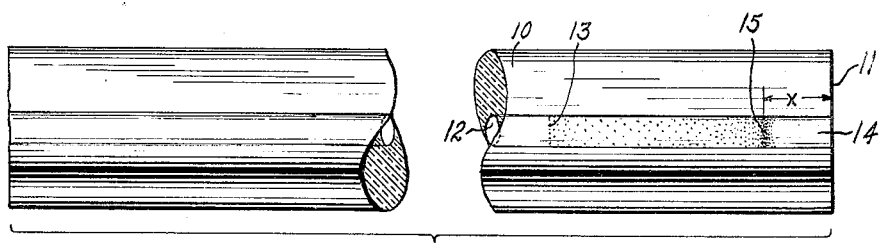

In the drawings:

Fig. 1 is a perspective view of an antibiotic assay machine with the capillary tube handling apparatus mounted thereon, Fig. 2 is a top plan view of the tube handling apparatus, Fig. 3 is a sectional elevation taken substantially along the line 3—3 of Fig. 2, certain elements of the light beam and optical system of the machine being shown in phantom, Fig. 4 is a detail sectional elevation taken substantially along the line 4—4 of Fig. 2, Fig. 5 is a detail sectional view of certain of the parts of the tube feeding mechanism the parts being shown in rest position, Fig. 6 is a detail sectional view similar to Fig. 5 but showing the positions occupied by the parts during a tube feeding and tube ejecting operation, and Fig. 7 is a greatly enlarged side elevation of a capillary tube of the type used in conjunction with the machine and apparatus herein described.

Referring to Fig. 7, there is shown on an enlarged scale, a capillary tube 10 having a flat end 11 and partially filled to point 13 with a bacteria-inoculated nutrient medium 13a, which has been immersed in an antibiotic solution and incubated as described previously. The distance X represents the linear extent of clear area 14 caused by the diffusion and inhibition of the antibiotic, and the band of intense aerobic growth 15 is shown at the inner extremity of the clear area. To the left of the aerobic growth 15 is an area of lesser bacterial growth, that growth being substantially an anaerobic growth.

Capillary tubes 10 are prepared in groups after the manner outlined above, and are then brought to an antibiotic assay machine of the type shown in Fig. 1 to have readings taken of the lengths of clear areas or inhibition zones 14.

The antibiotic assay machine shown in Figs. 1 and 3 is of the general type disclosed in U. S. Patent No. 2,498,030 issued to William W. Davis, on February 21, 1950 and entitled "Linear Measuring Device Having Light Projection Means."

The machine includes an enclosure or housing 16 having a top 17 and front and rear walls such as 18. Interiorly of housing 16 (see Fig. 3) there is provided a suitable light source 19, a converging lens 20, and a reflecting surface 21, the latter being arranged at an angle of 45° to the vertical so that the parallel rays of light striking the reflecting surface 21 are directed upwardly through a second convex or converging lens 22. Lens 22 is mounted within an opening 23, provided in a horizontally disposed plate 24 extending across a relatively large opening 26 in top 17, the plate being secured at its opposite sides (Fig. 1) as by screws 25 to the underside of the top. As shown diagrammatically in Fig. 3, light passing through converging lens 22 is brought to a focus by means of a lens 27 mounted closely adjacent to a relatively small opening 28 in a diaphragm 29 suitably supported directly over and in alignment with the vertical axis of converging lens 22 and opening 23. On the upper side of lens 27 the beam of light, indicated at 30, diverges and strikes an angularly disposed reflecting surface such as a mirror 32. From mirror 32 beam 30 passes through a transparent surface 33 of a prism 34 and is reflected upwardly from an inclined surface 35 of the prism to a ground glass or screen surface 36 thereof. As shown in Fig. 1, a reference line 37 extends across the horizontal center of screen surface 36. It will be understood that with a tube 10 positioned so that its inhibition zone 14 intersects the path of light beam 30, an image of such zone or portion thereof will be reflected from mirror 32 and projected in enlarged form upon screen surface 36.

The mechanism for presenting the tubes toward and for feeding and positioning the tubes into reading position with respect to light beam 30 will now be described. Plate 24, adjacent its opposite sides, is provided with openings 38 in which are mounted pulleys 39 journalled for rotation upon horizontally disposed stub shafts 42 (Figs. 2 and 3) fixed in spaced lugs 43 depending from plate 24 at opposite sides of each opening 39. Flexible cables or cords 44 strung over pulleys 39 are looped as at 45 to form bights around reduced portions 46 of a horizontally disposed drive shaft 47 journalled at its opposite ends in the side walls of housing 16 adjacent to the forward end of the machine. Coiled springs such as 48 (Fig. 3) connect the free ends of cords 44 and impart sufficient tension thereto to maintain the cords taut.

The tube supporting carriage is generally indicated at 49 and extends horizontally across opening 26. Carriage 49 is suspended upon and affixed to the upper stretches of cords 44 as by means of screw-clips 52 (Figs. 3 and 4), ample clearance being provided between the lower surface of plate 53 and the upper surface of plate 24 to permit of free and easy travel of the carriage longitudinally of the machine when movement is imparted to cords 44 by rotation of shaft 47 in a manner to be described.

The carriage comprises a flat, rectangularly-shaped, base plate 53 having an aperture 54 provided therein through which light beam 30 passes.

A pair of upstanding, spaced, parallel track members 56 and 57 are formed integrally with or affixed to base 53. The upper edges 58 and 59 of the track members are inclined, from their right ends as viewed in Fig. 1, downwardly toward shoulders 62 and 63 which serve as arresting stops to position a tube 10 into lateral alignment with aperture 54 and light beam 30. From the upper ends of shoulders 62 and 63, the continuing portions of track members 56 and 57 have their upper edges 64 and 65 inclined (leftwardly as viewed in Fig. 1) downwardly toward and terminating in upstanding projections 66 and 67, respectively.

Rearwardly of track member 57 and adjacent the rear end of base 53 there is provided an upstanding flange 68 in which is fixed a stationary arresting stop 69. Stop 69 is arranged to engage the flat end 11 of each tube 10 entering the zone reading position of carriage 49, i. e., the position where a tube rests against shoulders 62 and 63 and is laterally aligned thereby with aperture 54 and light beam 30 as shown in Figs. 1 and 3. Stop 69 insures the proper positioning of the tubes longitudinally of the carriage preparatory to the taking of a zone reading. Means are provided for insuring an abutting engagement of the flat end 11 of a tube 10 with stop 69. This means comprises a flexible cable release of the type commonly used on cameras, said cable release being generally indicated at 72. The inner end of cable 73 (Fig. 3) of such cable release is suitably affixed to a block 74 slidably mounted upon base 53 adjacent the inner surface of track member 56. The sheath 75 through which cable 73 extends is suitably secured as at 76 to track member 56 with the inner end of cable 73 slidably passing through a suitable opening provided in the track member. A horizontally disposed member 77, secured in block 74 in spaced relation from the cable release, slidably extends through a similar opening provided in track member 56 and has formed on its outer end an upstanding finger 78.

As clearly shown in Figs. 1, 2 and 3, when cable release 72 is unactuated, i. e., when the spring (not shown) of the cable release is acting to retract cable 73 within sheath 75, finger 78 lies in vertical alignment with a tube 10 occupying zone reading position on carriage 49, but in such spaced relation from that end of the tube opposite to the flat end 11 as will permit unobstructed entrance of a tube into zone reading position. To positively insure that the flat end 11 is abutting stop 69, the operator need only actuate cable release 72 by pressing inwardly upon a fingerpiece 79 which is affixed to cable 73 of the cable release. Such actuation moves block 74, member 77 and finger 78 a distance sufficient to engage that end of the tube opposite flat end 11, and cause the latter to be pushed into abutting engagement with stop 69. Release of fingerpiece 79 restores block 74, member 77 and finger 78 to the position shown in Figs. 1, 2 and 3. For convenience in operation and rigidity of construction, the fingerpiece end of cable release 72 may be mounted rigidly at its free end as indicated at 80 (Fig. 1) in the sidewall of housing 16.

The mechanism for ejecting a tube from reading position and for feeding the tubes consecutively, one by one, into reading position will now be described. This mechanism includes a pair of spaced, parallel arms 81, suitably secured to a horizontally disposed shaft 82 having its opposite ends journalled in track members 56 and 57. The free ends of the arms extend beyond the vertical planes of shoulders 62 and 63 for a distance substantially equal to the diameter of a capillary tube 10, and normally lie beneath the horizontal plane of the upper edges 58—59 of track members 56—57 as clearly shown in Figs. 4 and 5. A lever 83 is affixed to shaft 82 adjacent the outer side of track member 57 and lies in the path of movement of the free end of cable 84 of a second cable release, similar to cable release 72, and indicated generally at 85. The sheath 86 of cable release 85 is securely anchored to a lug 87 projecting upwardly from base 53. The fingerpiece 88 of the free end of cable release 85 is preferably anchored as at 89 in the sidewall of housing 16 oppositely to fingerpiece 79 of cable release 72, for reasons of convenience in operation and rigidity of construction. The spring (not shown) contained within sheath 86 normally urges cable 84 into retracted position within the sheath as shown in Fig. 5. Upon the pressing of fingerpiece 88 inwardly, the free end of cable 84 is pushed outwardly of its sheath 86 a distance sufficient to cause such end to engage lever 83 and rock it to the position shown in Fig. 6, where it is arrested by an adjustable screw stop 92, threadably mounted in an upstanding lug 93 affixed to base plate 53. The rocking movement imparted to lever 83 rocks shaft 82 and arms 81 upwardly from the position shown in Fig. 5 to the position shown in Fig. 6. This amount of movement elevates a tube 10 from reading position into a plane where its cylindrical surface lies above shoulders 63 whereupon the tube forthwith rolls downwardly upon the inclined surfaces 64 and 65 for stoppage by projections 66 and 67, or other tubes 10 previously stopped by said projections. Simultaneously, with the removal of a tube 10 as just described, the ends 94 of arms 81 engage the next adjoining capillary tube 10 of a supply of such tubes supported on inclined edges 58—59, to prevent its movement into reading position against shoulders 62 and 63 during such removal operation. Upon release of fingerpiece 88, the spring (not shown) within sheath 86 retracts cable 84 permitting the parts to return from the positions shown in Fig. 6 to their normal positions shown in Fig. 5. This permits arms 81 to move downwardly out of the path of tubes 10 whereupon the latter roll down the inclined edges 58 and 59 of track members 56 and 57, so that tube 10 which was just withheld from advancing into reading position descends into such position where it is laterally aligned with respect to aperture 54 and light beam 30 by engagement of the tube with shoulders 62 and 63.

The means for moving carriage 49 to move the tubes 10 and their inhibition zones 14 with respect to light beam 30, comprises a hand wheel 95 affixed to one end of shaft 47 extending through the right sidewall of housing 16. The periphery of wheel 95 has a calibrated scale 96, such scale underlying a transparent indicator 97 suitably secured in the machine frame, and having a reference line 98 inscribed thereon. Upon rotation of wheel 95, shaft 47 is rotated in a corresponding direction to impart movement to cords 44 and carriage 49 which, it will be remembered, is suspended by and affixed to the cords. By way of preliminary alignment of the carriage and the calibrated hand wheel 95, cables 44 are caused to slip about shaft 47 until the image of the forward edge of stop 69 falls on the reference line 37 of prism 31 with the reference scale on hand wheel 95 held at zero. It is noted that this zero position once set, remains standard and no further positioning is necessary unless, of course, the adjustment is accidentally or inadvertently altered.

In operation, a group of tubes 10, which are to have test readings taken, are placed upon the downwardly inclined surfaces 58—59 of track members 56—57 for presentation into reading position as shown by the illustration in Fig. 4. The operator first depresses fingerpiece 79 to insure the longitudinal registration of the first tube against stop 69 where it remains during the reading operation. Following this, hand wheel 95 is rotated to move the inhibition zone 14 of the particular tube being read, over light beam 30 until the image of the line of demarcation represented by the region of aerobic growth 15 is in precision alignment with reference line 37 of screen surface 36. Here a reading is taken directly from the calibrations 96 on hand wheel 95 and is suitably recorded. Following the recording, the operator next depresses fingerpiece 88, which as above described, ejects tube 10 from which the reading has just been taken, and, upon release of the fingerpiece, the next adjacent tube 10 rolls into reading position where it is laterally positioned by shoulders 62 and 63. Fingerpiece 79 is momentarily depressed to cause finger 78 to longitudinally position the tube 10 against stop 69, and the next reading is taken in the manner hereinbefore described. It is to be noted that the zero scale mark need not be returned to the reference line 98 between readings. Tubes removed from reading position gently roll down inclined edges 64 and 65. When a group of tubes from which readings have been taken have accumulated as suggested in dot-dash outline in Fig. 4, they may be readily removed by the operator.

By use of this tube handling apparatus in a machine of this character, zone reading operations are considerably expedited and facilitated, groups of tubes being readily and easily loaded on the inclined edges 58—59 for presentation to the reading position, the readings taken therefrom in rapid succession as just described and the groups collected and conveniently removed from the inclined edges 64—65. The entire series of operations is handled accurately, conveniently and with dispatch.

What we claim is:

1. In a machine of the class described, having an image receiving screen surface and means for projecting a beam of light to said surface, a capillary tube handling apparatus comprising a carriage movably supported in the path of said light beam and having an aperture therein through which said beam passes to said screen surface, means on said carriage for supporting a capillary tube in a reading position with respect to said aperture and in the path of said light beam, means for moving said carriage and said tube with respect to said light beam for linearly measuring a significant portion of the length of said tube, means for supporting a plurality of said tubes in readiness for presentation into said reading position, said reading position tube supporting means being adapted to align a tube laterally with respect to said aperture and said light beam upon entrance of said tube into said reading position, stop means for registering said tube longitudinally in said reading position, and manipulative means operable to position said tube positively against said stop means, remove a tube from said reading position and permit presentation of the next adjacent tube of said plurality into said reading position.

2. In a machine of the class described, having an image receiving screen surface and means for projecting a beam of light to said surface, a capillary tube handling apparatus comprising a carriage movably supported in the path of said light beam and having an aperture therein through which said beam passes to said screen surface, means on said carriage for supporting a capillary tube in a reading position with respect to said aperture and in the path of said light beam, means for moving said carriage and said tube with respect to said light beam for linearly measuring a portion of the length of said tube, means for supporting a plurality of said tubes in readiness for presentation into said reading position, said reading position tube supporting means being adapted to align a tube laterally with respect to said aperture and said light beam upon entrance of said tube into said reading position, stop means for registering said tube lonigtudinally in said reading position, manipulative means operable to positively position said tube against said stop means, remove a tube from said reading position and permit presentation of the next adjacent tube of said plurality into said reading position, and means for collecting in a group tubes removed from reading position, said latter means being inclined so as to transport a removed tube into said group forthwith upon its removal from reading position.

3. In a machine of the class described, having an image receiving screen surface and means for projecting a beam of light to said surface, a capillary tube handling apparatus comprising a carriage movably supported in the path of said light beam and having an aperture therein through which said beam passes to said screen surface, means on said carriage for supporting a capillary tube in a reading position with respect to said aperture and in the path of said light beam, means for moving said carriage and said tube with respect to said light beam for linearly measuring a portion of the length of said tube, means for supporting a plurality of said tubes in readiness for presentation into said reading position, said reading position tube supporting means being adapted to align a tube laterally with respect to said aperture and said light beam upon entrance of said tube into said reading position, stop means for registering said tube longitudinally in said reading position, manipulative means operable to positively position said tube against said stop means, and a second manipulative means operable to remove a tube from said reading position and permit presentation of the next adjacent tube of said plurality into said reading position.

4. In a machine of the class described; having a screen surface with a reference line and means for projecting a light beam created image upon said screen; an apparatus for presenting cylindrical capillary tubes, one after another, into image projecting relation with respect to said light beam for successive linear measurement reading operations; said apparatus comprising a carriage movable in the path of said light beam and having an aperture for the passage of said beam; a pair of spaced, parallel, track members on said carriage each having corresponding pairs of angularly disposed edges arranged in tandem and divided intermediate their ends adjacent said aperture by aligned shoulders; said shoulders serving to arrest the lowermost tube of a group of tubes supported on one pair of said edges in lateral alignment with said aperture and light beam; and a cable release actuated means operable to remove said lowermost tube from said one pair of angular edges over said shoulders to the other said pair of angular edges whereupon said removed tube rolls down the latter and a next adjacent tube of said group on said one pair of angular edges rolls into engagement with said shoulders.

5. In a machine of the class described; having a screen surface with a reference line and means for projecting a light beam created image upon said screen; an apparatus for presenting cylindrical capillary tubes, one after another, into image projecting relation with respect to said light beam for successive linear measurement reading operations; said apparatus comprising a carriage movable in the path of said light beam and having an aperture for the passage of said beam; a pair of spaced, parallel, track members on said carriage each having corresponding pairs of angularly disposed edges arranged in tandem and divided intermediate their ends adjacent said aperture by aligned shoulders; said shoulders serving to arrest the lowermost tube of a group of tubes supported on one pair of said edges in lateral alignment with said aperture and light beam; a stop member stationarily supported in spaced relation from one of said track members and substantially in lateral alignment with one end of said lowermost tube; cable release actuated means associated with the other of said track members operable to thrust said end of said lowermost tube into abutting engagement with said stop member to thereby longitudinally align said tube end so that its image on said screen surface coincides with said reference line; and a second cable release actuated means operable to remove said lowermost tube from said one pair of angular edges over said shoulders to the other said pair of angular edges whereupon said removed tube rolls down the latter and a next adjacent tube of said group on said one pair of angular edges rolls into engagement with said shoulders.

6. In a machine of the class described; having a screen surface with a reference line and means for projecting a light beam created image upon said screen; an apparatus for presenting cylindrical capillary tubes, one after another, into image projecting relation with respect to said light beam for successive linear measurement reading operations; said apparatus comprising a carriage movable in the path of said light beam and having an aperture for the passage of said beam; a pair of spaced, parallel, track members on said carriage each having corresponding pairs of angularly disposed edges arranged in tandem and divided intermediate their ends adjacent said aperture by aligned shoulders; said shoulders serving to arrest the lowermost tube of a group of tubes supported on one pair of said edges in lateral alignment with said aperture and light beam; a cable release actuated means operable to remove said lowermost tube from said one pair of angular edges over said shoulders to the other said pair of angular edges whereupon said removed tube rolls down the latter and a next adjacent tube of said group on said one pair of angular edges rolls into engagement with said shoulders; and terminal projection means associated with said other pair of angular edges to arrest and collect in a group tubes which have rolled down said edges.

WILLIAM W. DAVIS.
THOMAS V. PARKE.

REFERENCES CITED

The following references are of record in the file of this patent:

UNITED STATES PATENTS

| Number | Name | Date |
|---|---|---|
| 1,448,617 | Doe | Mar. 13, 1923 |
| 1,737,128 | Reyling et al. | Nov. 26, 1929 |
| 1,976,783 | Harding | Oct. 16, 1934 |
| 2,354,628 | Whitesell | July 25, 1944 |
| 2,481,310 | Hutchison et al. | Sept. 6, 1949 |
| 2,498,030 | Davis | Feb. 21, 1950 |
| 2,510,998 | O'Brien | June 13, 1950 |